United States Patent
Su

(10) Patent No.: US 7,585,379 B2
(45) Date of Patent: Sep. 8, 2009

(54) SURFACE TREATMENT METHOD FOR CARBON STEEL SCREWS EMBEDDED WITHIN ANTICORROSIVE WOOD, THE ASSOCIATED SURFACE STRUCTURE AND BAKING FINISHING FORMULA

(76) Inventor: Pao-Nuan Su, 235 Chung - Ho Box 8-24, Taipei (TW)

( * ) Notice: Subject to any disclaimer, the term of this patent is extended or adjusted under 35 U.S.C. 154(b) by 487 days.

(21) Appl. No.: 11/151,565

(22) Filed: Jun. 14, 2005

(65) Prior Publication Data

US 2006/0278124 A1    Dec. 14, 2006

(51) Int. Cl.
*C23C 22/05*  (2006.01)
*C23C 22/50*  (2006.01)

(52) U.S. Cl. .................. 148/243; 148/251; 148/272; 148/274; 106/14.05; 106/14.11; 106/14.21; 106/14.39

(58) Field of Classification Search .............. 148/243, 148/251, 272, 274; 106/14.05, 14.11, 14.21, 106/14.39
See application file for complete search history.

(56) References Cited

U.S. PATENT DOCUMENTS 6,500,886 B1 * 12/2002 Yamamuro et al. ............ 524/99

* cited by examiner

*Primary Examiner*—Roy King
*Assistant Examiner*—Lois Zheng

(57) ABSTRACT

A baking finishing formula comprise metallic zinc, metallic nickel, metallic aluminum, polyethylene glycol, a silane, fluoride-containing surfactants, corrosion inhibitors and a mixed-type additive.

3 Claims, 1 Drawing Sheet

SURFACE TREATMENT METHOD FOR CARBON STEEL SCREWS EMBEDDED WITHIN ANTICORROSIVE WOOD, THE ASSOCIATED SURFACE STRUCTURE AND BAKING FINISHING FORMULA

FIELD OF THE INVENTION

The present invention relates to surface treatments for carbon steel screws and the surface functions thereby produced, more particularly to a baking finishing formula and surface structure.

BACKGROUND OF THE INVENTION

Wood preservation treatments are needed to resist against weather erosion and worm eating. The most common wood preservation treatment is to immense wood in chromatic copper arsenate (which is briefly called as CCA). However, CCA is potentially hazardous, since children may intake arsenic chromium copper acids by touching outdoor playground facilities through a CCA wood preservation treatment. The prohibition of CCA as a wood preservation method induces the ACQ method. In that, wood is immersed into a solution of high copper ion content and a high pressure is applied to the solution to make the copper ions infiltrate into the wooden fibers. The copper ion concentration of the wood thereby produced is four times higher than that of the wood processed by CCA. The metallic parts embedded therein will be eroded. Structures made by ACQ wood may collapse after an extended period of time. To reduce the erosion in ACQ wood, the metallic parts in the wood should be processed through an anticorrosion treatment, which may be one of:

1. using metallic parts made of corrosion-resistant alloys;

2. coating the metallic parts with an impermeable covering;

3. treating the metallic parts by hot-dip Galvanic coating of zinc.

The screws used in wood structures are made of iron or other non-ironic alloys. The screws made of non-ironic alloys are expensive and too soft. Therefore, the application is limited.

An ironic material after heat treatment by carburizing becomes a carbon steel material which is mechanically tough and suitable for making parts associated with ACQ processed wood.

The carbon steel screws embedded within anticorrosive wood have their surfaces commonly plated with zinc by electrolysis and then inactivated by chromic acid. Finally, they will be protected by organic finishing. They look beautiful and will not be damaged when they are engaged with the wood. However, the anticorrosive ability of the parts is not satisfactory.

Further, the problem of pollution caused by Chromium-6 in the process of surface inactivation by a chromic acid cannot be ignored.

SUMMARY OF THE INVENTION

Accordingly, the present invention is to provide a baking finishing formula whereby a uniform, smooth and fine protective layer of thin film can be formed over a carbon steel screw, and whereby the anticorrosive ability of the surface can be enhanced.

The baking finishing formula for carbon steel screws comprises metallic zinc solution with a concentration of 5-10 grams per liter and ion particle with a size of 25-75 microns in diameter; metallic nickel solution with a concentration of 0.2-0.5 grams per liter and ion particle with a size of 100-200 microns in diameter; metallic aluminum solution with a concentration of 10-20 grams per liter and with an ion particle size of 15-25 microns in diameter; a fluoride-containing surfactant with a concentration of 0.2% and corresponding to polyethylene glycol; a plurality of corrosion inhibitors in a mixture of succinic anhydride, n-butylamine, n-octylamine, n-decylamine and n-dodecylamine; polyethylene glycol with a concentration of 30-50 grams per liter and with a molecular weight of 2000-10000; and a mixed-type additive with a concentration of 10-60 ppm.

The various objects and advantages of the present invention will be more readily understood from the following detailed description when read in conjunction with the appended drawings.

DETAILED DESCRIPTION OF THE PREFERRED EMBODIMENT

Figures 1, 2, 3:
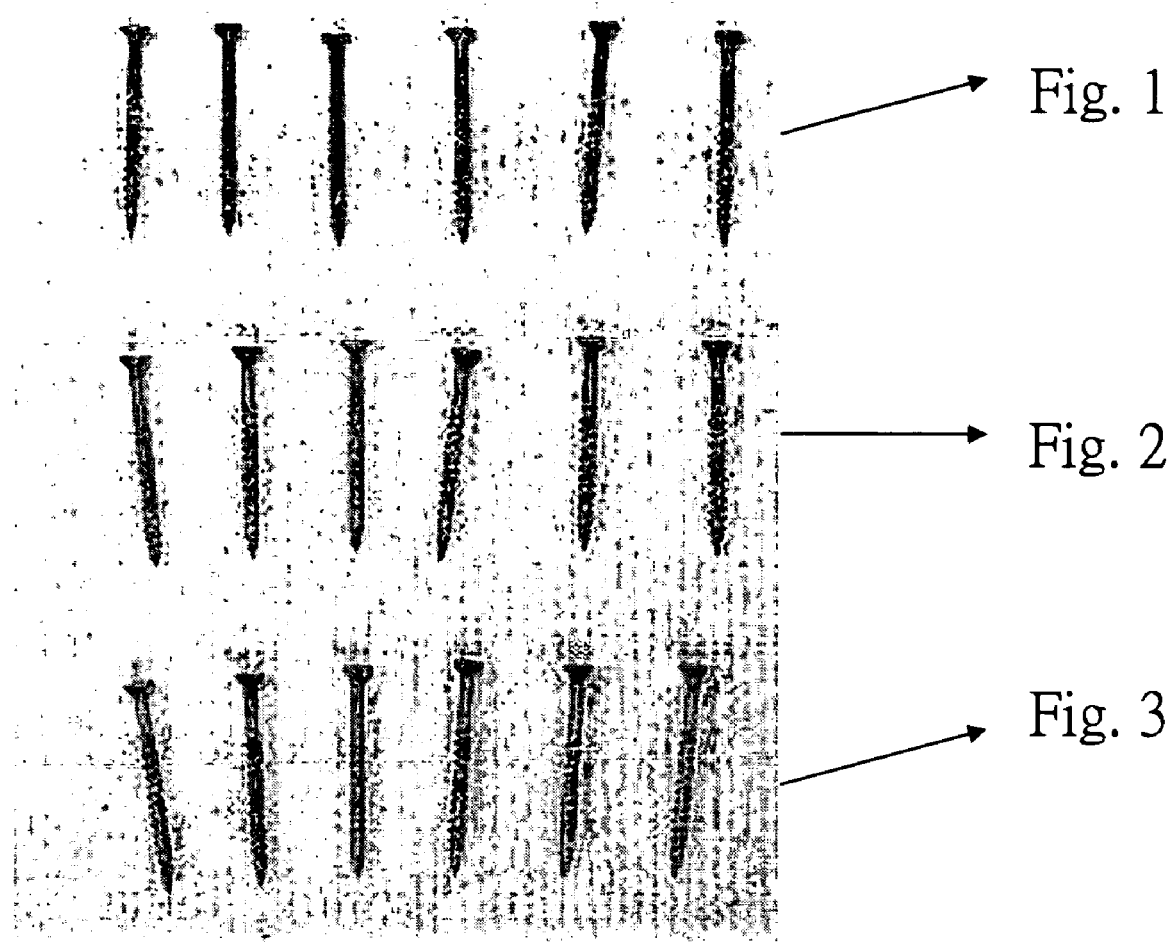
FIG. 1 is a photo that shows a collection of carbon steel screws after 90 days of treatment by AWPA E-12 94.
FIG. 2 is another photo that shows another collection of carbon steel screws being processed.
FIG. 3 is a photo that shows a collection of carbon steel screws after 90 days of the treatment of prior art by AWPA E-12 94.

A preferred embodiment of the present invention is a baking formula for carbon steel screws comprising:

h. metallic zinc solution with a concentration of 5-10 grams per liter and an ion particle size of 25-75 microns in diameter;

i. metallic nickel solution with a concentration of 0.2-0.5 grams per liter and an ion particle size of 100-200 microns in diameter;

j. metallic aluminum solution with a concentration of 10-20 grams per liter and an ion particle size of 15-25 microns in diameter;

k. a fluoride-containing surfactant with a concentration of 0.2% and corresponding to polyethylene glycol;

l. a plurality of corrosion inhibitors in a mixture of succinic anhydride, n-butylamine, n-octylamine, n-decylamine and n-dodecylamine;

m. polyethylene glycol with a concentration of 30-50 grams per liter and of molecular weight 2000-10000; and n. a mixed-type additive with a concentration of 10-60 ppm.

The fluoride-containing surfactant is a product of 3M (Minnesota Mining and Manufacturing Co.) with a product number of FC-4430.

The mixed-type additive is a benzotriazole derivative with the following molecular structure:

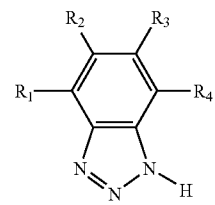

The groups R1, R2, R3 and R4 are selected from alkyls of carbon number 1-4.

The benzotriazole derivative includes benzotriazole, 4-methyl-benzotriazole, 5-methyl-benzotriazole, 4,7-dimethyl-benzotriazole, 5,6-dimethyl-benzotriazole.

The surface treatment method for carbon steel screws comprises the steps of:

(5) cleaning the surfaces of carbon steel screws so that the impurities thereon are removed;

(6) processing the carbon steel screws with a plurality of corrosion inhibitors under 60-80° C.;

(7) adding a silane and a fluoride-containing surfactant; baking the screws under 120-150° C., whereby a thin layer of siloxane will be formed on the surfaces of the screws;

(8) immersing the screws in a baking formula and baking the screws under 170-180° C., where the baking formula comprises:
   a. metallic zinc solution with a oncentration of 5 grams per liter;
   b. metallic nickel solution with a concentration of 0.2 grams per liter;
   c. metallic aluminum solution with a concentration of 10 grams per liter;
   d. a fluoride-containing surfactant with a concentration of 0.2%;
   e. a plurality of corrosion inhibitors in a mixture of succinic anhydride, n-butylamine, n-octylamine, n-decylamine and n-dodecylamine;
   f. polyethylene glycol with a concentration of 30 grams per liter and of molecular weight 2000-10000; and
   g. a mixed-type additive with a concentration of 50 ppm.
where polyethylene glycol of molecular weight 2000-10000 is used as an adhesive material.

The properties of the particles of metallic zinc, nickel and aluminum are changed by the silane so that they are easy to uniformly distribute in the polyethylene glycol solution.

The fluoride-containing surfactant effectively reduces the surface tension of the silane and smoothens the coating.

The corrosion inhibitors are used to remove the impurities of the surface or after the process of zinc plating. The screws immersed in the mixture of the corrosion inhibitors are processed with a centrifugal and drying means to become carbon steel screws or zinc plated carbon steel screws.

The mixed-type additive can inhibit the adhesive material from being destroyed.

Thereby, the surfaces of the carbon steel screws can be plated with a layer of metallic zinc with a thickness of 7-8 microns through electrolysis.

Preferably, the associated baking formula comprises:
   h. metallic zinc solution with a concentration of 5 grams per liter;
   i. metallic nickel solution with a concentration of 0.2 grams per liter;
   j. metallic aluminum solution with a concentration of 10 grams per liter;
   k. a fluoride-containing surfactant with a concentration of 0.2%;
   l. a plurality of corrosion inhibitors in a mixture of succinic anhydride, n-butylamine, n-octylamine, n-decylamine and n-dodecylamine;
   m. polyethylene glycol with a concentration of 30 grams per liter and of molecular weight 2000-10000; and
   n. a mixed-type additive with a concentration of 50 ppm.

The associated surface structure produced by the present invention comprises a carbon steel screw, a surface protective layer over the screw produced by the associated baking formula with contents described above.

The preferred embodiments processed by the surface treatment method for carbon steel screws embedded within anti-corrosive wood are compared with the surfaces treated by the surface treatments of the prior art.

Experiment One

Step 1: removing the rust and impurities on the surface of carbon steel screws by a mechanical means including cleansing and drying;

Step 2: immersing the carbon steel screws within the plurality of corrosion inhibitors under 60° C.~80° C. to form a collection of treated carbon steel screws without chromium-6;

Step 3: adding the silane and the fluoride-containing surfactant and baking the solution at 120-150° C. to form a smooth layer of silicon oxide over the surfaces of the carbon steel screws; and Step 4: baking the carbon steel screws in the baking finishing formula at 170-180° C. to form a protective layer over the surfaces; the baking finishing formula comprise metallic zinc solution with a concentration of 5 grams per liter, metallic nickel solution with a concentration 0.2 grams per liter, metallic aluminum solution with a concentration of 10 grams per liter, a fluoride-containing surfactant with a concentration of 0.2%, polyethylene glycol with a concentration of 30 grams per liter and of molecular weight of 2000-10000; and a mixed-type additive with a concentration of 50 ppm. The screws are tested over 90 days by AWPA E-12 94, and the result is shown in FIG. 1. The weight loss after the test is less than 0.2%.

Experiment Two

Step 1: removing the rust and impurities on the surface of carbon steel screws by a mechanical means including cleansing and drying;

Step 2: coating the surface of the carbon steel screws with a metallic zinc layer with a particle size of 7-8 microns by electrolysis;

Step 3: immersing the carbon steel screws within the plurality of corrosion inhibitors under 60° C.~80° C. to form a collection of treated carbon steel screws without chromium-6;

Step 4: adding the silane and the fluoride-containing surfactant and baking the solution at 120-150° C. to form a smooth layer of silicon oxide over the surfaces of the carbon steel screws; and Step 5: baking the carbon steel screws in the baking finishing formula at 170-180° C. to form a protective layer over the surfaces; the baking finishing formula comprise metallic zinc solution with a concentration of 5 grams per liter, metallic nickel solution with a concentration of 0.2 grams per liter, metallic aluminum solution with a concentration of 10 grams per liter, a fluoride-containing surfactant with a concentration of 0.2%, polyethylene glycol with a concentration of 30 grams per liter and with a molecular weight of 2000-10000; and a mixed-type additive with a concentration of 50 ppm. The screws are tested over 90 days by AWPA E-12 94, and the result is shown in FIG. 2. The weight loss after the test is less then 0.1%.

An experiment by a traditional method for comparison comprises the steps of:

Step 1: removing the rust and impurities on the surface of carbon steel screws by a mechanical means including cleansing and drying; coating the surface of the carbon steel screws with a metallic zinc layer with a particle size of 7-8 microns by electrolysis;

Step 2: treating the carbon steel screws with chromium-6;

Step 3: baking the screws at 170-180° C. to form a surface inactivated protective layer by the baking finishing formula comprising metallic zinc solution with a concentration of 5 grams per liter, metallic aluminum solution with a concentration of 10 grams per liter, polyethylene glycol with a concentration of 30 grams per liter (PEG 2000~10000). The screws are tested over 90 days by AWPA E-12 94, and the result is shown in FIG. 3. The weight loss after the test is higher then 1%.

Therefore, the surface treatment method for carbon steel screws embedded within anticorrosive wood and the associated surface structure of the screws are realized by the baking finishing formula. The present invention is tested by AWPA E-12 94 and results in a loss of weight of 1%-0.2%, compared with a loss of 1% by a traditional method.

The present invention has the following advantages of:

1. the smooth thin film formed on the zinc-plated surfaces of the carbon steel screws being superior to the traditional film of chromium-6 in anticorrosion;
2. the baking finishing formula of the present invention being environment-friendly; and
3. the surface treatment of screws of the present invention forming a smooth and fine protective layer over the surfaces which will be tightly attached to the substrate material, whereby the layer can sustain the friction caused when the screws are being used and the corrosion by the anticorrosive wood.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A baking finishing formula for carbon steel screws, comprising:
   a. metallic zinc solution with a concentration of 5-10 grams per liter and an ion particle size of 25-75 microns in diameter;
   b. metallic nickel solution with a concentration of 0.2-0.5 grams per liter and with an ion particle size of 100-200 microns in diameter;
   c. metallic aluminum solution with a concentration of 10-20 grams per liter and an ion particle size of 15-25 microns in diameter;
   d. a fluoride-containing surfactant with a concentration of 0.2% and corresponding to polyethylene glycol;
   e. a plurality of corrosion inhibitors in a mixture of succinic anhydride, n-butylamine, n-octylamine, n-decylamine and n-dodecylamine;
   f. polyethylene glycol with a concentration of 30-50 grams per liter and with a molecular weight of 2000-10000; and
   g. a mixed-type additive with a concentration of 10-60 ppm.

2. The baking finishing formula for carbon steel screws of claim 1 wherein said mixed-type additive is a benzotriazole derivative with the following molecular structure:

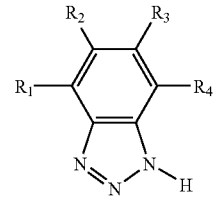

where groups R1, R2, R3 and R4 are selected from alkyls of carbon number 1-4.

3. The baking finishing formula for carbon steel screws of claim 2 wherein said benzotriazole derivative is selected form one of Benzotriazole, 4-methyl-benzotriazole, 5-methyl-benzotriazole), 4,7-dimethyl-benzotriazole, and 5,6-dimethyl-benzotriazole.

* * * * *